(12) United States Patent
Foote et al.

(10) Patent No.: US 7,260,258 B2
(45) Date of Patent: Aug. 21, 2007

(54) METHODS FOR MULTISOURCE COLOR NORMALIZATION

(75) Inventors: Jonathan T Foote, Menlo Park, CA (US); Donald G. Kimber, Foster City, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 754 days.

(21) Appl. No.: 10/459,470

(22) Filed: Jun. 12, 2003

(65) Prior Publication Data
US 2004/0252884 A1 Dec. 16, 2004

(51) Int. Cl.
*G06K 9/00* (2006.01)
*G06K 9/32* (2006.01)
*G06K 9/68* (2006.01)

(52) U.S. Cl. ................... 382/167; 382/300
(58) Field of Classification Search ............ 382/162, 382/164, 165, 167, 219, 260, 284, 294, 300; 345/589, 592, 600–604, 630; 358/515, 518; 348/588, 721
See application file for complete search history.

(56) References Cited

U.S. PATENT DOCUMENTS

| | | | |
|---|---|---|---|
| 4,707,110 A * | 11/1987 | Harada et al. ............. | 399/184 |
| 4,907,075 A | 3/1990 | Braudaway | |
| 4,924,299 A * | 5/1990 | Mizuno et al. ............ | 348/721 |
| 5,047,842 A | 9/1991 | Bouman, Jr. et al. | |
| 5,140,412 A | 8/1992 | Shishido et al. | |
| 5,432,712 A | 7/1995 | Chan | |
| 5,438,651 A * | 8/1995 | Suzuki et al. ............. | 345/592 |
| 5,528,290 A | 6/1996 | Saund | |
| 5,611,000 A | 3/1997 | Szeliski et al. | |
| 5,745,305 A | 4/1998 | Nalwa | |
| 5,835,099 A | 11/1998 | Marimont | |
| 5,993,001 A | 11/1999 | Bursell et al. | |
| 6,075,905 A | 6/2000 | Herman et al. | |
| 6,148,118 A | 11/2000 | Murakami et al. | |

(Continued)

OTHER PUBLICATIONS

J. Foote and D. Kimber. "FlyCam: Practical Panoramic Video." In *Proceedings of IEEE International Conference on Multimedia and Expo*, col. III, pp. 1419-1422, 2000.

(Continued)

*Primary Examiner*—Amir Alavi
(74) *Attorney, Agent, or Firm*—Sughrue Mion, PLLC; Joseph Bach, Esq.

(57) ABSTRACT

A method for improvement of the consistency of color and brightness across boundaries of multicamera and/or multi-displayed overlapping or near overlapping composite images, reduction of objectionable artifacts at overlapping image seams of composite images, adjustment of color and brightness/intensity on either side of overlapping image seams, application of color correction across a composite image, reduction of color and intensity mismatches of composite images, gradual change of color across image seams of a composite image, including altering color outside of overlap regions is provided so that the seams are less discernible and to avoid sharp color changes across a composite or mosaic image are reduced or avoided. Color difference between two source images which form a composite is estimated by looking at color pixels from each source image region, determining a centroid of a cluster in a color space formed by the pixels of each source image, and determining the difference between cluster centroids for overlapping or nearly overlapping source image regions which are a measure of the vector color difference between such regions. The vector color difference between at least two overlapping source image regions are interpolated or mapped across those images.

24 Claims, 6 Drawing Sheets
(3 of 6 Drawing Sheet(s) Filed in Color)

U.S. PATENT DOCUMENTS

| | | | |
|---|---|---|---|
| 6,215,914 | B1 | 4/2001 | Nakamura et al. |
| 6,278,463 | B1 | 8/2001 | Chapman et al. |
| 6,331,860 | B1 | 12/2001 | Knox |
| 6,349,153 | B1 | 2/2002 | Teo |
| 6,385,349 | B1 | 5/2002 | Teo |
| 6,396,960 | B1 | 5/2002 | Yoshimura |
| 6,463,172 | B1 | 10/2002 | Yoshimura |
| 6,587,593 | B1* | 7/2003 | Matsuoka et al. .......... 382/260 |
| 2004/0085330 | A1* | 5/2004 | Walker et al. .............. 345/630 |
| 2004/0252884 | A1* | 12/2004 | Foote et al. ................ 382/162 |

OTHER PUBLICATIONS

Nicolescu, M and Medioni, G., "Electronic Pan-Tilt-Zoom: A Solution for Intelligent Room Systems." In *Proceedings of IEEE International Conference on Multimedia and Expo*, vol. III, pp. 1581-1584, 2000.

iMove.com press release "iMove Releases 2nd Generation Spherical Video Camera", Dec. 12, 2000, http://www.imoveinc.com/07news_and_events/XXview_release.asp?release™iMove+Releases+2nd+Generation+Spherichs l+Video+Camera.

Raskar, R., Welch, G., and Fuchs, H. "Seamless Projection Overlaps Using Image Warping and Intensity Blending,", In *Fourth International Conference on Virtual Systems and Multimedia*, Gifu, Japan. Nov. 1998 http://www.cs.unc.edu/-sic/pubs/VSMM_seamless.pdf.

R. Szeliski. Image mosaicing for tele-reality applications. In *IEEE Workshop on Applications of Computer Vision (WACV'94)* pp. 44-53, Sarasota, Florida, Dec. 1994. IEEE Computer Society.

S. Chen, "QuickTime VR - an image-based approach to virtual environment navigation," in *Computer Graphics, Annual Conference Series*, pp. 29-38, ACM SIGGRAPH, 1995.

* cited by examiner

METHODS FOR MULTISOURCE COLOR NORMALIZATION

BACKGROUND OF THE INVENTION

1. Field of Invention

This invention relates to digital image processing in general, and to color normalization of images from multiple sources in particular.

2. Description of Related Art

Various methods and systems exist for combining several digital images into an extended image mosaic. This is desirably accomplished in a manner that yields a composite image or mosaic that looks like a single image, for example, without seams or other merging features. Boundaries between neighboring image segments that overlap or nearly overlap often have substantial differences in contrast, intensity, resolution and color which appear as visible seams in the composite image or mosaic.

Multicamera video systems typically need color calibration. Calibrating color balance and shutter speed on all video cameras has a disadvantage of being time consuming, and may sacrifice the dynamic range of the multicamera system. Moreover, in outdoor settings, it is difficult to avoid situations where one camera image region has direct sun and other cameras image regions have various degrees of shade. If all cameras use a uniform shutter speed, then the camera image region having direct sun is likely to be overexposed and the other camera image regions are likely to be underexposed. However, using automatic gain control to compensate for large dynamic scene brightness ranges can lead to objectionable image seams when the gain of neighboring cameras is significantly different.

U.S. Pat. No. 6,075,905, for example, merges color images based on a comparison between colors in the overlap regions between the individual images which form the composite or mosaic image. For two overlapping images, the 905 patent performs a least-square fit over the image-overlap region to determine the color-space affine transformation among the RGB composite signal that adjusts the colors of the second image so that the colors of the second image in the image-overlap region most closely match the colors of the first image-overlap region. The resulting affine transformation is then applied to the entirety of the second image. Extending the objective function to more than two overlapping images is done by ascribing an affine transformation to all but one of the images, the transformations being with respect to the untransformed, or reference, image, and then by adding the squared RGB color differences over all the pixels in all overlap regions.

U.S. Pat. No. 6,349,153, for example, merges color images and uses the information in the overlap region between images to correct the color of the two images. To compensate for unwanted artifacts of color bands at the overlap region, the color of the images is adjusted based on pixel information from the overlap region so as to bring the two images into line with each other. Brightness, contrast and gamma parameters in the overlap region are used to modify image color intensity. The 153 patent tapers the color correction so that full color correction is applied within the overlap region. Outside the overlap region, only a fraction of the correction is applied, where the fraction preferably tapers from 100% to 0% as the pixel distance from the overlap region increases.

U.S. Pat. No. 6,278,463, for example, processes first and second digital images, including color images, with overlapping image content defining an overlap region including common image data. Color image pixel data in the overlap region is processed to produce a composite image.

SUMMARY OF THE INVENTION

Various exemplary embodiments of the systems and methods according to this invention improve the consistency of color and brightness across boundaries of multicamera and/or multidisplayed overlapping or near overlapping images.

Various exemplary embodiments of the systems and methods according to this invention reduce objectionable artifacts at overlapping image seams of composite and/or mosaic images.

Various exemplary embodiments of the systems and methods according to this invention adjust color and brightness/intensity on either side of overlapping image seams of composite and/or mosaic images.

Various exemplary embodiments of the systems and methods according to this invention apply color correction across as much of the images that make up a composite image or image mosaic.

Various exemplary embodiments of the systems and methods according to this invention reduce color and intensity mismatches of the images that make up a composite image or image mosaic.

Various exemplary embodiments of the systems and methods according to this invention gradually change color across image seams of a composite or mosaic image so that the seams are less discernible.

Various exemplary embodiments of the systems and methods according to this invention alter color outside of overlap regions to avoid sharp color changes across a composite or mosaic image.

Various exemplary embodiments of the systems and methods according to this invention estimate color difference between two source images which form a composite or mosaic image from the color pixel values in each source image region.

Various exemplary embodiments of the systems and methods according to this invention determine a centroid of a cluster in a color space formed by the pixels of each source image.

Various exemplary embodiments of the systems and methods according to this invention determine the difference between cluster centroids for overlapping or nearly overlapping source image regions as a measure of the vector color difference between such regions.

Various exemplary embodiments of the systems and methods according to this invention interpolate or map the vector color difference between at least two overlapping source image regions across those images.

Various exemplary embodiments of the systems and methods according to this invention move the color cluster centroids to match the overlap regions and regions outside of the overlap region.

Various exemplary embodiments of the systems and methods according to this invention smooth color and brightness differences across a multiple image composites to make them gradual and less objectionable while preserving the dynamic range available from camera gain control.

Various other features and advantages of the systems and methods according to this invention will become apparent from the following detailed description of exemplary embodiments.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF EXEMPLARY EMBODIMENTS

Multicamera panoramic imaging systems are becoming increasingly popular. However, a major problem of multicamera or multidisplay imaging systems is the consistency of color and brightness across image boundaries. When constructing an image by concatenating images from multiple sources, color and intensity differences can lead to objectionable seam artifacts, even when the optical geometry is nearly perfect. For multicamera systems, different scene illumination, automatic gain control, and color variabilities inherent in analog video formats can contribute to intensity differences across image seams.

Figure 1:
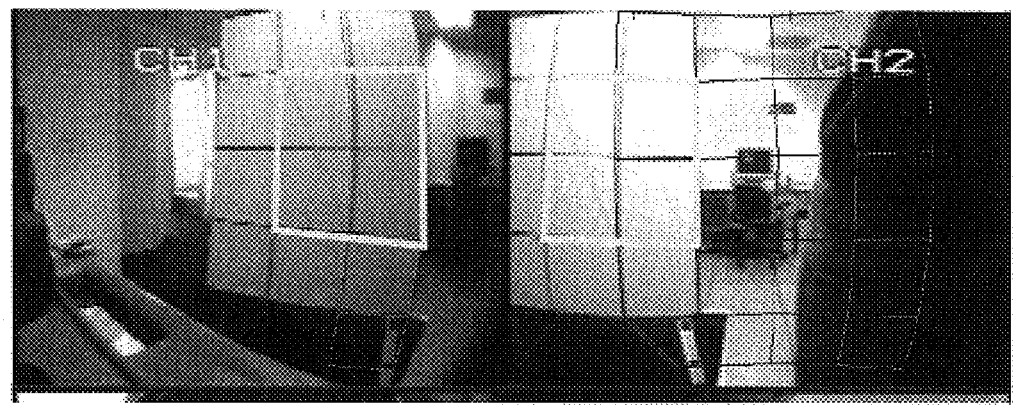
FIG. 1 is an exemplary perspective view of two overlapping images with different color balance.

FIG. 1 shows an example of two overlapping images formed by two video cameras. In FIG. 1, a white board has a substantially different intensity of colors in the two images because of the gain control differences between the different cameras. Additionally, camera and/or display lenses, can have non-uniform brightness responses across their field of view, especially at wide angles.

Various exemplary embodiments of the systems and methods according to this invention remedy this problem by adjusting the color and intensity on either side of an image seam to reduce the apparent discrepancy. Because the eye is much less sensitive to gradual color changes, various exemplary embodiments of the systems and methods according to this invention apply the color correction across as much of the image as is practical. This substantially reduces the effects of color and light intensity value mismatches in the composite image.

Because the systems and methods according to this invention concern at least two images, from two different sources, having an overlap region, various exemplary embodiments of the systems and methods of this invention can estimate the color difference between the at least two images and correct that color difference. According to the systems and methods of this invention, image registration, i.e., determining the overlap region, is accomplished by any known or hereafter developed technique. In various exemplary embodiments of the systems and methods according to this invention, if image regions do not overlap, then near-overlap regions may be used.

Various exemplary embodiments of the systems and methods according to this invention employ multicamera video systems which typically need color calibration. Color calibration of multicamera video systems may be accomplished, for example, by calibrating the color balance and setting the identical shutter speed on all video cameras. As discussed above, this has disadvantages.

Various exemplary embodiments of the systems and methods according to this invention may make use of the automatic gain control found in many cameras to compensate for the limited dynamic range of video cameras in the multicamera system. Objectionable image overlap areas may result when the gain on neighboring cameras is substantially different. Various exemplary embodiments of the systems and methods according to this invention smooth gain differences across the entire image panorama so that changes are gradual and much less objectionable, while preserving the increased dynamic range available from camera gain control.

As noted above, an overlap region of a composite or mosaic image (including a panoramic image) is defined as a portion of the composite or mosaic image that is imaged by more than one device. In general, an overlap region is outlined or demarcated or defined by seam lines and delineates which image pixels will be used to create the composite or mosaic image. If image regions do not overlap, then very close regions may be used without loss of applicability of various exemplary embodiments of the systems and methods according to this invention. In the situation of near overlap, seam lines also define the area of near-overlap.

Figure 2:
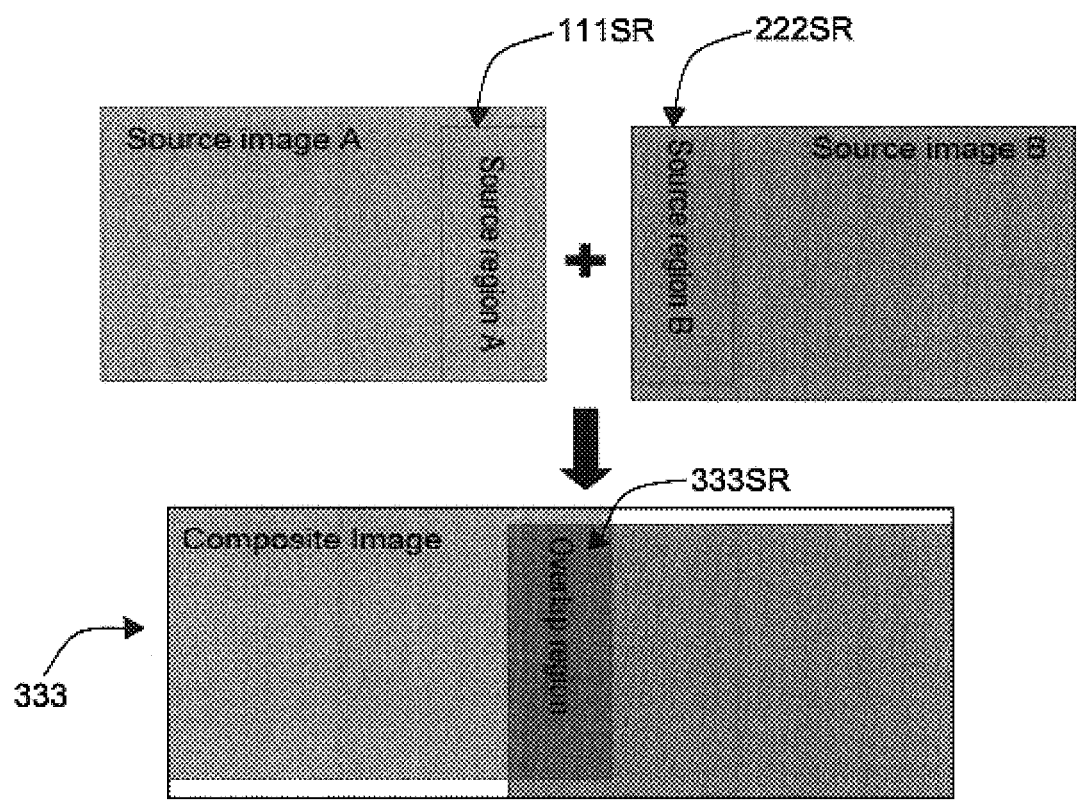
FIG. 2 is an exemplary schematic view of two overlapping images combined to overlay and form a composite or mosaic image.

Each overlap region has more than one source region, which is the area of a source image that corresponds to a particular overlap region. In FIG. 1, source regions are indicated by the two quadrilaterals that have dashed outlines. FIG. 2 shows the relationship between images and regions of those images. Source images are combined into a final "composite image" or "mosaic image", such as, for example, by using image warping or geometry correction.

Various exemplary embodiments of the systems and methods according to this invention substantially reduce the effects of color and intensity mismatches in a composite image by first estimating the color difference between the two images 111 and 222. One exemplary embodiment of the systems and methods according to this invention estimates the color difference between two overlapping images by looking at the color distribution of pixels in the overlap region 333SR. The color difference can be estimated by comparing the statistics of pixels from the source regions 111SR and 222SR. For example, considered in a color space such as RGB or HSV, all pixels from a source region 111SR, will form a cluster. The difference between cluster centroids from the two source regions 111SR and 222SR is used as a measure of the color difference that must be corrected.

Figure 3:
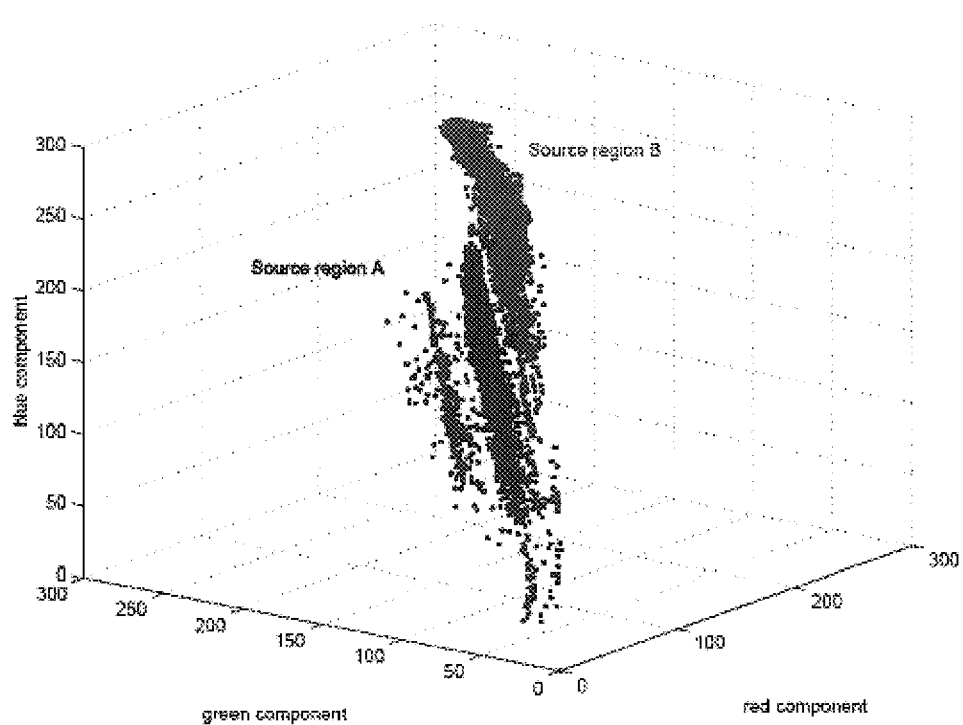
FIG. 3 is an exemplary perspective view of clusters of color pixels in three-dimensional RGB color space of the two images shown in FIG. 2.

FIG. 3 shows, the two clusters from the source regions 111SR and 222SR. In FIG. 3, one cluster is brighter and redder than the other. Centroids can be determined using any number of methods such as arithmetic or geometric means and medians. In one exemplary embodiment according to the systems and methods of this invention, the arithmetic mean is used, as it minimizes the means square error of the distance to points in the cluster. In the RGB color space, the centroid of a color image may be formulated as $$\begin{bmatrix} R_c \\ G_c \\ B_c \end{bmatrix} = \frac{1}{N} \sum_{i=1}^{N} \begin{bmatrix} R_i \\ G_i \\ B_i \end{bmatrix} \quad \text{(Eq. 1)}$$

where N is the number of pixels of an image.

Another equation which may be used to formulate the centroid of a color image is $$\begin{bmatrix} R_g \\ G_g \\ B_g \end{bmatrix} = \left( \prod_{i=i}^{N} \begin{bmatrix} R_i \\ G_i \\ B_i \end{bmatrix} \right)^{\frac{1}{N}} \quad \text{(Eq. 2)}$$

Because these equations are computationally simple, they are widely used for images with uniform texture. Other equations may be used with the systems and methods according to this invention. Also, any particular color space can be used. For example, color spaces where Euclidian distances are better correlated with perceptual differences may work better than those where Euclidian distances are not well correlated with perceptual color distances.

The difference between two centroids is a vector in color space. Shifting one centroid by this distance will align it with the other centroid. Analogously, adding this vector to each pixel from the first source region will bring it closer to the color of corresponding pixels of the second source region. Thus, adding this offset will cause the color of one source region to match the color of the other source region. This approach can be generalized as a particular affine transformation that will take one cluster into the other. An example of the use of affine transformations is found in U.S. Pat. No. 5,835,099, the subject matter of which is incorporated herein by reference in its entirety.

Figure 4:
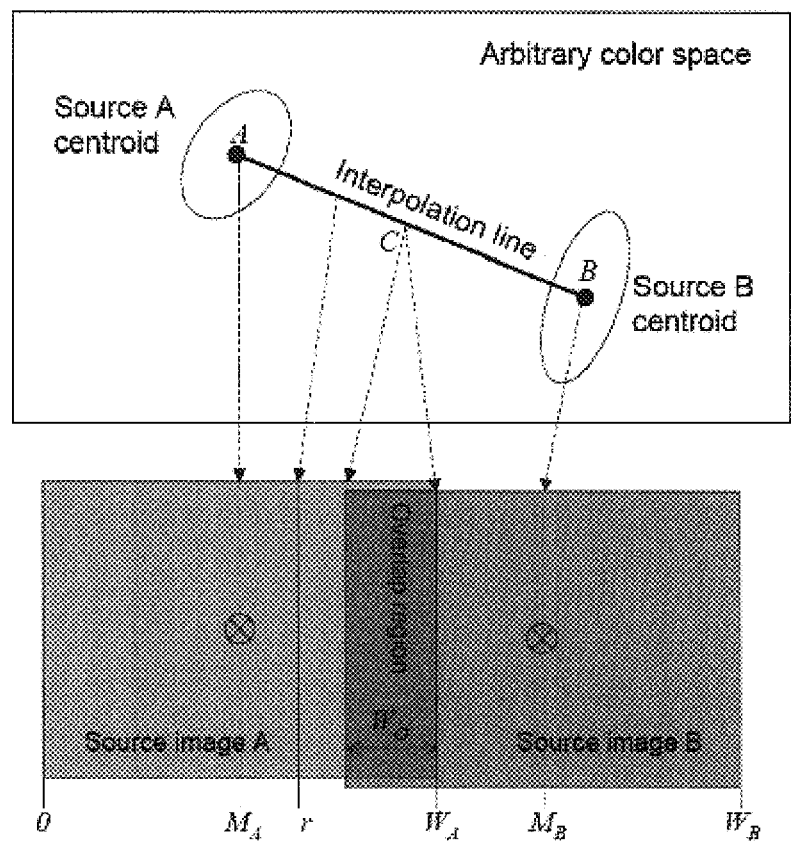
FIG. 4 is an exemplary illustration showing a correlation of centroids of clusters of pixels of the two images of FIG. 2 in an arbitrary color space in a composite image which includes an overlap region.
Figure 8:
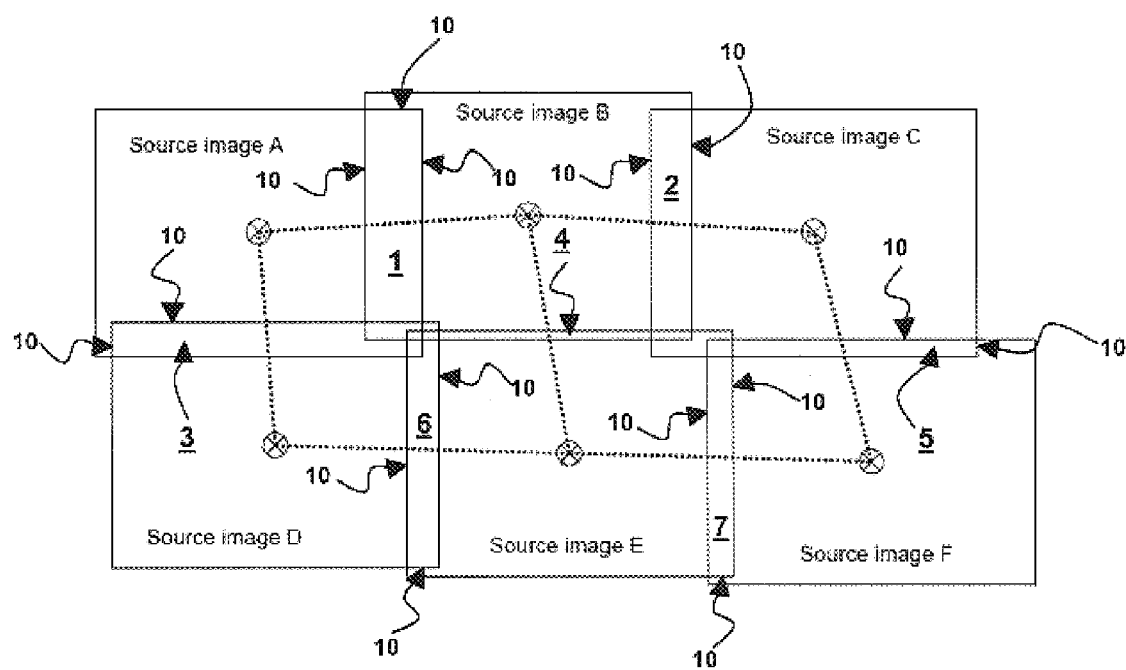
FIG. 8 is an exemplary schematic view of an arbitrary number of source images combined to form a composite or mosaic image, the center of each source image being connected the centers of the other source images by a mesh.

Various exemplary embodiments of the systems and methods according to this invention do not simply match colors in the overlap region. Various exemplary embodiments of the systems and methods according to this invention gradually change the color across image seams so that those image seams are less perceptible. In one exemplary embodiment of the systems and methods according to this invention, the color outside of the overlap region is changed to avoid sharp changes in color. To do this, various exemplary embodiments of the systems and methods according to this invention interpolates the vector difference across the composite image. FIG. 4 shows how one exemplary embodiment of the systems and methods according to this invention interpolates the color correction across two images. The overlap regions are corrected by adding and/or subtracting one half of the color correction vector to all pixels in all columns that contain the overlap region. In other words, one half of the color correction vector centroid is added to one source image and one half of the color correction vector is subtracted from the other source image. Thus, the centroids of both source regions are moved to the half-way point of the line between them, denoted "C" in FIG. 4. Pixel columns outside of the overlap region are also corrected proportionally to their distance from the center of the image. Columns just at the overlap region boundary may be corrected by an offset of "c". This offset is reduced proportionally to zero as the columns approach the center of the image. This linear interpolation can be extended to quadratic, bilinear, bi-cubic, or higher-order interpolations, given additional centroids, such, as, for example, as shown in FIG. 8, as well understood by those skilled in the art.

With reference to FIG. 4, one exemplary embodiment of the systems and methods according to this invention formalizes the color correction algorithm in the following manner. In this regard, $M_A$ and $M_B$ are the pixel midpoints of each source image. The width of image source region A is defined as $W_A$–O, in pixels. The width of image source region B is defined as $(W_B-W_A)+O$, in pixels. The width of composite image overlap region is defined as $W_O$, in pixels. In color space, A and B are the centroids or means of the pixels from source regions A and B, respectively. C is the midpoint or mean of A and B. The various geometric relations illustrated in FIG. 4 are for the simple case of two overlapped images. In this case, each source image has three regions: the overlap region which has a constant color correction; the region between the overlap and the image midpoint which has a linearly varying color correction; and an uncorrected region at the edge. In one exemplary embodiment according to the systems and methods of this invention, using the definitions set forth above, the additive color offset O for a given pixel row r in the three regions of source image A can be calculated using the following equations:

$$0 \leq r < M_A: O=0 \quad \text{(Eq. 3)}$$

$$M_A \leq r < W_A - W_O: O = \left( \frac{r - M_A}{W_A - W_O - M_A} \right)(C - A) \quad \text{(Eq. 4)}$$

$$W_A-W_O \leq r \leq W_A: O=C-A \quad \text{(Eq. 5)}$$

Similarly, the offset O for a given pixel row r in source image B is determined as follows:

$$0 \leq r < W_O: O=C-B \quad \text{(Eq. 6)}$$

$$W_O \leq r < M_B: O = \left( \frac{r - W_O}{M_B - W_O} \right)(C - B) \quad \text{(Eq. 7)}$$

$$M_B \leq r \leq W_B: O=0 \quad \text{(Eq. 8)}$$

Various exemplary embodiments of the systems and methods according to this invention, as described above, work for any common color space regardless of dimension, including one-dimensional gray scale images. Moreover, Various exemplary embodiments of the systems and methods according to this invention, as set forth above, can be generalized to affine transforms, rather than translations. Because affine transformations are linear, affine transformations can be interpolated and inverted.

Figure 5:
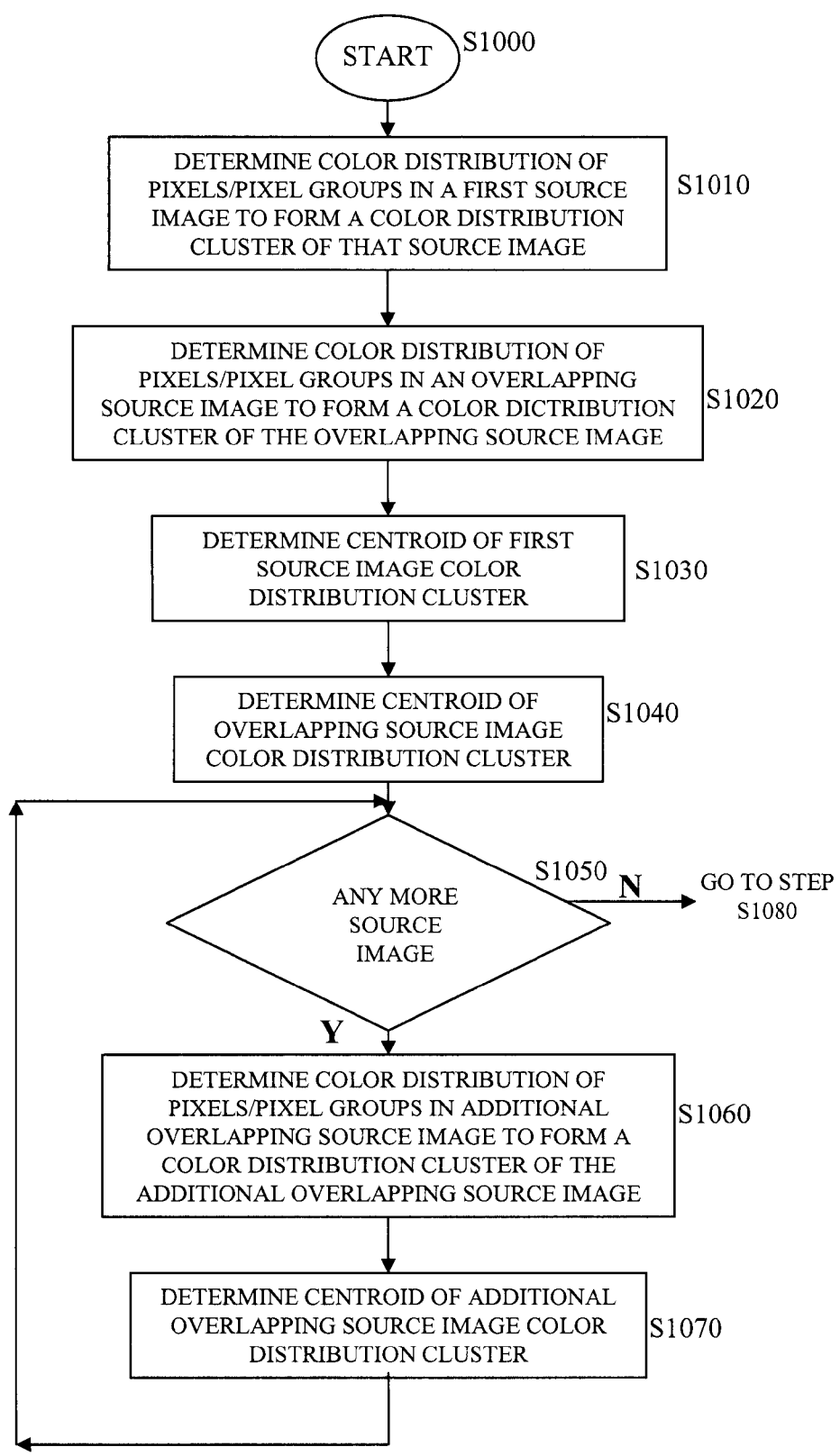
FIGS. 5 and 6 comprise a flow chart of an exemplary method of color normalization according to this invention.

FIG. 5 shows a result of a color normalization using the aforementioned techniques. Because color changes are subtle, the lower half of the image has been left uncorrected for comparison. Note that the corresponding regions of the white board have a much better color match in the upper, corrected region.

According to various exemplary embodiments of the systems and methods of this invention, if only two images are to be corrected, the interpolation can be done across the entire width of the image instead of from center-to-center. In other words, in the exemplary embodiment described above, $M_A=0$ and $M_B=W_B$. According to various exemplary embodiments of the systems and methods of this invention, if the overlap region is particularly wide, the interpolation can be continued across the overlap region. In other words, $W_O=0$. According to various exemplary embodiments of the systems and methods of this invention, the images need not overlap at all to perform color corrections. Where images do not overlap at all, the source regions can be image regions that are "close." For example, if the source images are to be abutted left-to-right, the source regions can be the right-most portion of the left source image and the left-most portion of the right source image.

The systems and methods according to this invention are not limited to linear interpolation. For example, any one-to-one mapping can also be used. It should be noted that "one-to-one means" that any input has a unique output. Moreover, various exemplary embodiments of the systems and methods according to this invention can be applied to arbitrarily overlapped images, rather than to linearly concatenated images. For example, as shown in FIG. 8, any number of images can be combined with or without overlap. In FIG. 8, a mesh is constructed between image centers. The transformation between any two images may be calculated as set forth above. This results in a number of transforms at the center point of every mesh side. The color correction for any individual pixel can, for example, be found by interpolating from the nearest centers of adjacent mesh sides. FIG. 8 identifies seven overlap areas, labeled (1) through (7). Each overlap area is defined by seams 10. Composite image/mosaic image overlap area (1) is made up of image source regions A, B, D and E. Composite image/mosaic image overlap area (2) is made up of image source regions B, C, E and F. Composite image/mosaic image overlap area (3) is made up of image source regions A, B, D and E. Composite image/mosaic image overlap area (4) is made up of image source regions A–F. Composite image/mosaic image overlap area (5) is made up of image source regions A, B, C, E and F. Composite image/mosaic image overlap area (6) is made up of image source regions A, B, D and E. Composite image/mosaic image overlap area (7) is made up of image source regions C, E and F. Normalization of multiple image sources may be achieved by scaling the resultant pixels so that they do not exceed the maximum permissible pixel level. One exemplary method of scaling involves dividing each pixel value by the maximum of all pixel values, which results in a value between zero and one for all pixels, then multiplying by the maximum permissible pixel value. This ensures that no pixel values will exceed the maximum.

If the systems and methods according to this invention are working with white, bright seams in the overlap regions, color corrections can be estimated to achieve an optimum color registration. If seams for example are too dark or have a predominant single color hue, then the correction factor may be inappropriate for other conditions. However, the corrected image will still minimize the color difference for those particular illumination conditions. In one exemplary embodiment of the systems and methods according to this invention, a panoramic video system is used and color is normalized once at system startup,3 or by user command. In the absence of large illumination changes, this procedure will be nearly optimal. Alternatively, in other embodiments of the systems and methods according to this invention, a color correction can be pre-computed when imaging a calibration seam, such as for example, a uniformly lighted neutral gray seam. According to other exemplary embodiments of the systems and methods of this invention, the color correction factors may be periodically recalculated, either at set time intervals, or in response to an illumination change detected from source images.

Figure 6:
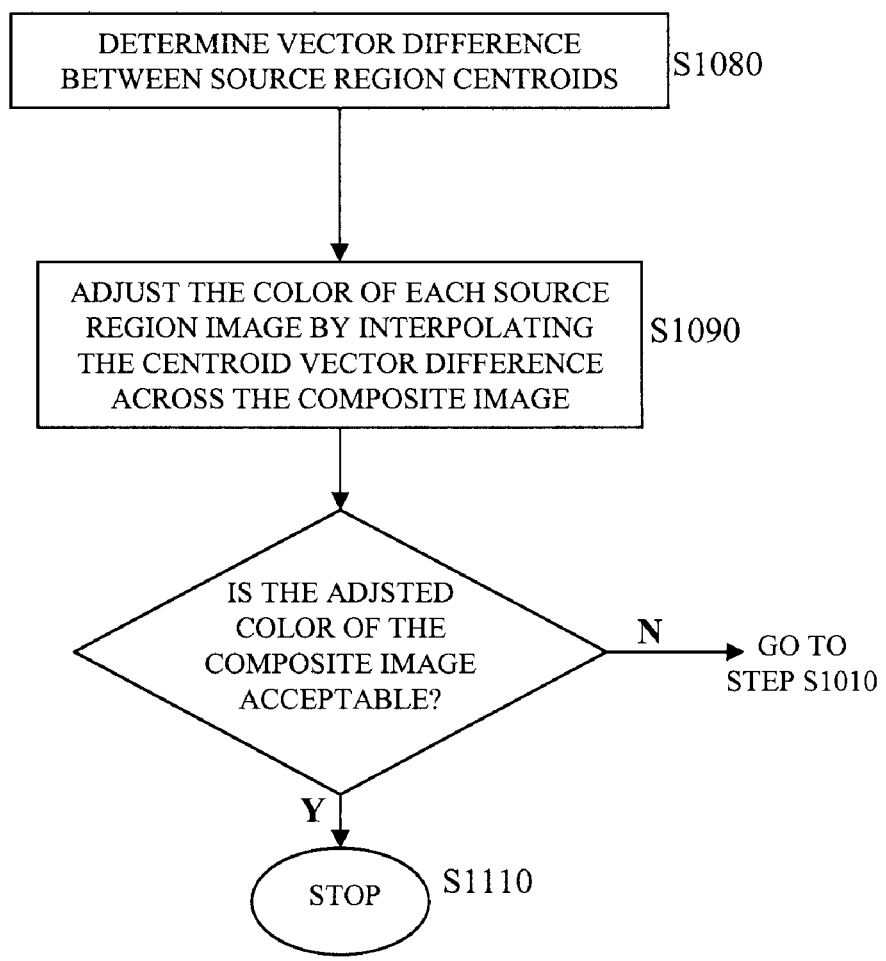
Figure 7:
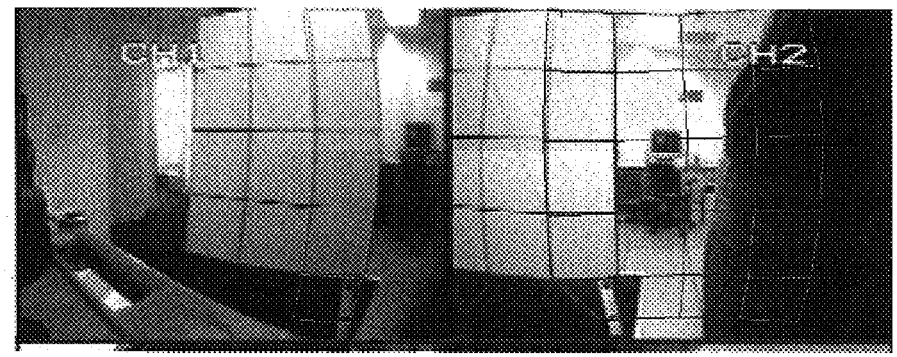
FIG. 7 is an exemplary perspective view of the two overlapping images of FIG. 1 which have been color compensated according to the method set forth in the flow chart of FIGS. 5 and 6.

One exemplary embodiment of the methods according to this invention is outlined in FIGS. 5 and 6. In step S1000, the process begins. Control then proceeds to step S1010, where a determination is made of the color distribution of pixels and/or pixel groups, including, for example, pixel columns, in a first source image to form a color distribution cluster of that source image. Next, control proceeds to step S1020, where a determination is made of the color distribution of pixels and/or pixel groups, including, for example, pixel columns, in an overlapping source image to form a color distribution cluster of that source image. Control then proceeds to step S1030, where a centroid of the first source image color distribution cluster is determined. Then, control proceeds to step S1040, where a centroid of the overlapping source color image color distribution cluster is determined. Control then moves to step S1050, where a determination is made whether there are any more overlapping source image regions in the mosaic/composite image 100. If not, control jumps to step S1080. If so, control proceeds to step S1060, where a determination is made of the color distribution of pixels in the additional overlapping image source, such as, for example, source C, to form an additional overlapping image source region color distribution cluster. Next, in step S1070, a centroid of the additional overlapping image source region color distribution cluster is determined. Then, control returns to step S1050 to determine if there are any more overlapping source image regions that make up composite/mosaic image 100. If not, control proceeds to step S1080. If so, the process repeats by going through steps S1060 and S1070 and returning to step S1050 until the result in step S1050 is no, whereupon control jumps to step S1080, as noted above.

In step S1080, the difference between the centroids of all of the color distribution clusters is determined. This difference may be expressed as $\Delta C$. Next, control proceeds to step S1090, where the color of each source region is adjusted by interpolation of the centroid vector differences across the composite image. Step S1090 is explained in detail, below. Control then proceeds to step S1100, where a determination is made whether the adjusted color of the composite/mosaic image 100 is acceptable. If so, control proceeds to step S1110, where the process ends. If not, then control returns to step S1010.

Step S1090 may be accomplished in many different ways. In one exemplary embodiment of the methods according to this invention, discussed in connection with FIG. 4, step S1090 commences by determining the constant additive color correction offset O, which is equal to C–A for pixel groups, such as, for example, pixel columns, pixel rows, and other geometric arrangements of pixels, in the overlap region $W_O$. Then, the linearly varying additive correction offset $$O = \left(\frac{r - M_A}{W_A - W_O - M_A}\right)(C - A) I \qquad \text{(Eq. 9)}$$

is determined for pixel rows in the region between the overlap region and the image midpoint. Then, the constant additive color correction offset O=0 is determined for pixel rows in the region between the image midpoint and the far image edge, i.e., the image edge opposite from the edge that helps to define the overlap region.

In another exemplary embodiment according to the methods of this invention, if there are only two source images that overlap and need to be corrected, the linear interpolation in the region between the overlap region and the image midpoint may be applied between the overlap region and the far edge of the image. In this exemplary embodiment, the constant additive color correction mentioned above regarding the area between the image midpoint and the far edge of the image is not used.

Various weights may also be applied to the centroids in the mesh array shown in FIG. 8, depending on the number of centroids involved and the size of the overlap area of the source regions for which a centroid is determined. For multiple centroids, the interpolated values can be determined using, for example, bilinear, bi-cubic or higher-order interpolation techniques.

Figure 9:
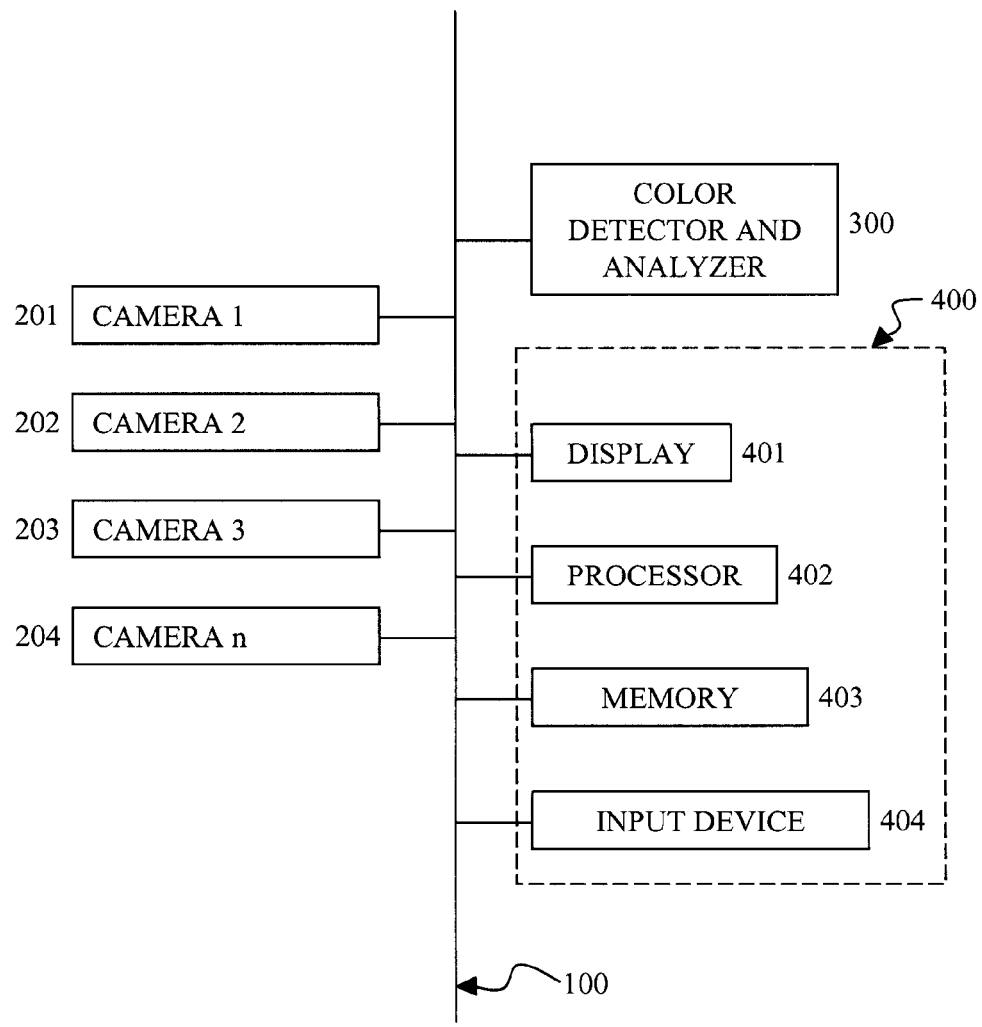
FIG. 9 is an exemplary schematic representation of a system used to normalize color of multicamera imaging systems according to this invention.

FIG. 9 shows an exemplary embodiment of a system according to this invention used to normalize color in multicamera imaging systems. Connected to a communication bus 100 are four cameras C1, C2, C3 and C4. The number of cameras may vary. Also connected to the communication bus 100 is a color image detector and analyzer 300, and a user interface/data processor 400, which may include a display 401, a data processor 402, a memory 403 and an input device 404. User interface/data processor may be, for example, a personal computer. Each camera has conventional controls for contrast control, color balance, brightness and/or darkness control, gain control, noise reduction, etc. The color image detector and analyzer can perform the interpolation and mapping and pixel data handling mentioned above, and the personal computer or other data processor can be used, with or without user input, to feedback signals to the cameras C1, C2, C3, C4, etc., including camera gain control, to normalize the color across a composite image.

While this invention has been described in conjunction with the specific embodiments above, it is evident that many alternatives, combinations, modifications, and variations are apparent to those skilled in the art. Accordingly, the exemplary embodiments of this invention, as set forth above are intended to be illustrative, and not limiting. Various changes can be made without departing from the spirit and scope of this invention.

What is claimed is:

1. A method of changing the color of a composite image based on color differences between at least two individual source images which make up the composite image, comprising:
    determining a color distribution of a first source image to form a color distribution cluster of the first source image;
    determining a color distribution of an overlapping source image to form a color distribution cluster of the overlapping source image;
    determining a centroid of each color distribution cluster;
    determining the difference between the source image centroids;
    adjusting the color of each source image across the composite image based on an interpolation of the difference.

2. The method of claim 1, wherein the number of individual source images that make up the composite image is greater than two, the method further comprising:
    determining a color distribution of each source image that overlaps another source image.

3. The method of claim 2, further comprising:
    determining a centroid of the color distribution of each source image that overlaps another source image.

4. The method of claim 1, wherein the number of overlapping images that makes up the composite image is greater than two.

5. The method of claim 1, wherein adjusting the color of each source image based on an interpolation of the difference is across the entire composite image.

6. The method of claim 1, wherein adjusting the color of each source image based on an interpolation of the difference is across at least half of the image, including a mid-point of the image.

7. A method of changing the color of a composite image based on color differences between individual source images which make up the composite image, comprising:
    determining a color distribution of a first source image to form a color distribution cluster of the first source image;
    determining a color distribution of an overlapping source image to form a color distribution cluster of the overlapping source image;
    determining a centroid of each color distribution cluster;
    determining the difference between the source image centroids;
    adjusting the color of each source image across the composite image based on a one-to-one mapping of the difference.

8. The method of claim 7, wherein the number of individual source images that make up the composite image is greater than two, the method further comprising:
    determining a color distribution of each source image that overlaps another source image.

9. The method of claim 8, further comprising:
    determining a centroid of the color distribution of each source image that overlaps another source image.

10. The method of claim 7, wherein the number of overlapping images that makes up the composite image is greater than two.

11. The method of claim 7, wherein adjusting the color of each source image based on an interpolation of the difference is across the entire composite image.

12. The method of claim 7, wherein adjusting the color of each source image based on an interpolation of the difference is across at least half of the image, including a mid-point of the image.

13. A system that changes the color of a composite image based on color differences between at least two individual source images which make up the composite image, comprising:
    a determination element to determine a color distribution of a first source image to form a color distribution cluster of the first source image;
    a determination element to determine a color distribution of an overlapping source image to form a color distribution cluster of the overlapping source image;
    a centroid determination element to determine a centroid of each color distribution cluster;
    a difference determination element to determine the difference between the source image centroids; and
    an adjustor element to adjust the color of each source image across the composite image based on an interpolation of the difference.

14. The system of claim 13, wherein the number of individual source images that make up the composite image is greater than two, the system further comprising:
   a distribution determining element to determine a color distribution of each source image that overlaps another source image.

15. The system of claim 14, wherein:
   the centroid determining element determines a centroid of the color distribution of each source image that overlaps another source image.

16. The system of claim 13, wherein the number of overlapping images that makes up the composite image is greater than two.

17. The system of claim 13, wherein the adjustment of the color of each source image based on an interpolation of the difference is across the entire composite image.

18. The system of claim 13, wherein the adjustment of the color of each source image based on an interpolation of the difference is across at least half of the image, including a mid-point of the image.

19. A system to change the color of a composite image based on color differences between individual source images which make up the composite image, comprising:
   a distribution element to determine a color distribution of a first source image to form a color distribution cluster of the first source image;
   a distribution element to determine a color distribution of an overlapping source image to form a color distribution cluster of the overlapping source image;
   a centroid determination element to determine a centroid of each color distribution cluster;
   a difference determination element to determine the difference between the source image centroids; and
   an adjustment element to adjust the color of each source image across the composite image based on a one-to-one mapping of the difference.

20. The system of claim 19, wherein the number of individual source images that make up the composite image is greater than two, the system further comprising:
   a distribution determining element to determine a color distribution of each source image that overlaps another source image.

21. The system of claim 20, wherein:
   the centroid determining element determines a centroid of the color distribution of each source image that overlaps another source image.

22. The system of claim 19, wherein the number of overlapping images that makes up the composite image is greater than two.

23. The system of claim 19, wherein adjustment of the color of each source image based on an interpolation of the difference is across the entire composite image.

24. The system of claim 19, wherein adjustment of the color of each source image based on an interpolation of the difference is across at least half of the image, including a mid-point of the image.

* * * * *